United States Patent
MacFarlane

(10) Patent No.: US 10,740,166 B2
(45) Date of Patent: *Aug. 11, 2020

(54) THREAD BASED DYNAMIC DATA COLLECTION

(71) Applicant: International Business Machines Corporation, Armonk, NY (US)

(72) Inventor: Peter R. MacFarlane, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 72 days.

This patent is subject to a terminal disclaimer.

(21) Appl. No.: 15/849,397

(22) Filed: Dec. 20, 2017

(65) Prior Publication Data

US 2018/0137002 A1    May 17, 2018

Related U.S. Application Data

(63) Continuation of application No. 13/348,932, filed on Jan. 12, 2012, now Pat. No. 9,916,192.

(51) Int. Cl.
*G06F 11/00* (2006.01)
*G06F 11/07* (2006.01)
*G06F 11/34* (2006.01)

(52) U.S. Cl.
CPC ...... *G06F 11/0787* (2013.01); *G06F 11/3404* (2013.01); *G06F 11/3476* (2013.01); *G06F 2201/865* (2013.01)

(58) Field of Classification Search
CPC .. G06F 11/1482; G06F 11/2082; G06F 11/34; G06F 11/0787; G06F 11/3409; G06F 11/30; G06F 11/0703
See application file for complete search history.

(56) References Cited

U.S. PATENT DOCUMENTS

| | | | | |
|---|---|---|---|---|
| 5,918,004 A | * | 6/1999 | Anderson | G06F 11/0715 714/25 |
| 6,282,701 B1 | * | 8/2001 | Wygodny | G06F 11/3466 702/183 |
| 6,308,319 B1 | * | 10/2001 | Bush | G06F 8/458 707/999.202 |
| 6,505,491 B2 | | 1/2003 | Ochi et al. | |

(Continued)

FOREIGN PATENT DOCUMENTS

CN    101719301    6/2010
WO    2013104964 A1    7/2013

OTHER PUBLICATIONS

Windows "ETW (Event Tracing for Windows)" Aug. 4, 2009, MSDN, pp. 1-4 (Year: 2009).*

(Continued)

*Primary Examiner* — Bryce P Bonzo
*Assistant Examiner* — Jeison C Arcos
(74) *Attorney, Agent, or Firm* — Cuenot, Forsythe & Kim, LLC

(57) ABSTRACT

Execution of a program in a plurality of threads is monitored. Responsive to identifying an exception triggered by the program execution in a first of the plurality of threads, a data collector can be dynamically created for the exception. The data collector can be configured to collect data exclusively relevant to the program execution in the first thread.

15 Claims, 3 Drawing Sheets

(56) References Cited

U.S. PATENT DOCUMENTS

| | | | |
|---|---|---|---|
| 6,587,967 B1* | 7/2003 | Bates | G06F 11/3664 714/35 |
| 6,772,376 B1 | 8/2004 | Merkin et al. | |
| 7,080,287 B2 | 7/2006 | Salem | |
| 7,266,733 B2 | 9/2007 | Bazinet et al. | |
| 7,308,609 B2 | 12/2007 | Dickenson et al. | |
| 7,343,521 B2 | 3/2008 | Kitamorn et al. | |
| 7,580,822 B2* | 8/2009 | Nace | G06F 11/3419 702/182 |
| 7,827,447 B2 | 11/2010 | Eberbach et al. | |
| 7,840,856 B2 | 11/2010 | Apte et al. | |
| 2002/0049934 A1* | 4/2002 | Anderson | G06F 11/0715 714/45 |
| 2002/0199172 A1* | 12/2002 | Bunnell | G06F 11/3466 717/128 |
| 2003/0056200 A1* | 3/2003 | Li | G06F 11/323 717/128 |
| 2003/0159133 A1* | 8/2003 | Ferri | G06F 11/3636 717/130 |
| 2004/0024726 A1* | 2/2004 | Salem | G06F 11/079 |
| 2004/0153997 A1* | 8/2004 | Anderson | G06F 11/0715 717/127 |
| 2005/0055602 A1* | 3/2005 | Werner | G06F 11/1482 714/6.31 |
| 2006/0031054 A1* | 2/2006 | Nace | G06F 11/3419 703/13 |
| 2007/0276197 A1* | 11/2007 | Harmon | G06F 19/00 600/300 |
| 2007/0288500 A1* | 12/2007 | Sarnowicz | G06F 11/3409 |
| 2008/0147853 A1* | 6/2008 | Anderson | G06F 11/0715 709/224 |
| 2008/0222456 A1 | 9/2008 | Jones | |
| 2009/0157359 A1 | 6/2009 | Chernoff | |
| 2009/0241136 A1 | 9/2009 | Clark et al. | |
| 2009/0271663 A1 | 10/2009 | Vining | |
| 2010/0095101 A1* | 4/2010 | Derdak | G06F 8/24 712/228 |
| 2013/0185600 A1 | 11/2013 | MacFarlane | |
| 2013/0297977 A1 | 11/2013 | MacFarlane | |
| 2013/0305101 A1* | 11/2013 | Gupta | G06F 21/56 714/47.3 |

OTHER PUBLICATIONS

"Enhanced First Failure Data Capture," [online] IP.com, Aug. 8, 2007 [retrieved Jan. 6, 2012] retrieved from the Internet: <http://ip.com/IPCOM/000156870> 2 pages.

Brodie "Quickly Finding Known Software Problems via Automated Symptom Matching" Sep. 2005, IEEE, p. 1-10.

OpenSTA, "OpenSTA: Creating and Editing Collectors" May 2003, OpenSTA, p. 1-20.

Windows, "ETW (Event Tracing for Windows)" Aug. 2009, Microsoft, p. 1-2.

Windows2, ".NET Framework Versions and Dependencies" 2008, Microsoft, p. 1-6.

Windows3, "EventProviderTraceListener Class" 2008, Microsoft, p. 1-6.

U.S. Appl. No. 13/348,932, Non-Final Office Action, dated Dec. 23, 2013, 5 pg.

U.S. Appl. No. 13/348,932, Final Office Action, dated Jul. 24, 2014, 8 pg.

U.S. Appl. No. 13/348,932, Non-Final Office Action, dated Jun. 2, 2015, 9 pg.

U.S. Appl. No. 13/348,932, Final Office Action, dated Nov. 20, 2015, 10 pg.

U.S. Appl. No. 13/348,932, Examiner's Answer, Aug. 19, 2016, 5 pg.

U.S. Appl. No. 13/348,932, Decision on Appeal, Oct. 26, 2017, 8 pg.

U.S. Appl. No. 13/348,932, Notice of Allowance, dated Nov. 2, 2017, 5 pg.

U.S. Appl. No. 13/873,553, Non-Final Office Action, dated Jan. 14, 2014, 5 pg.

U.S. Appl. No. 13/873,553, Final Office Action, dated Jul. 25, 2014, 8 pg.

U.S. Appl. No. 13/873,553, Advisory Action, dated Nov. 19, 2014, 2 pg.

U.S. Appl. No. 13/873,553, Non-Final Office Action, dated Jun. 2, 2015, 9 pg.

U.S. Appl. No. 13/873,553, Final Office Action, dated Nov. 19, 2015, 11 pg.

U.S. Appl. No. 13/873,553, Examiner's Answer, Aug. 19, 2016, 6 pg.

U.S. Appl. No. 13/873,553, Subsequent Examiner's Answer, 7 pg.

U.S. Appl. No. 13/873,553, Notice of Abandonment, May 26, 2017, 2 pg.

WIPO Appln. IB2012057536, Int'l. Search Report, dated May 30, 2013, 4 pg.

WIPO Appln. IB2012057536, Written Opinion, dated May 30, 2013, 3 pg.

WIPO Appln. IB2012057536, Int'l. Preliminary Report on Patentability, dated Jul. 15, 2014, 4 pg.

* cited by examiner

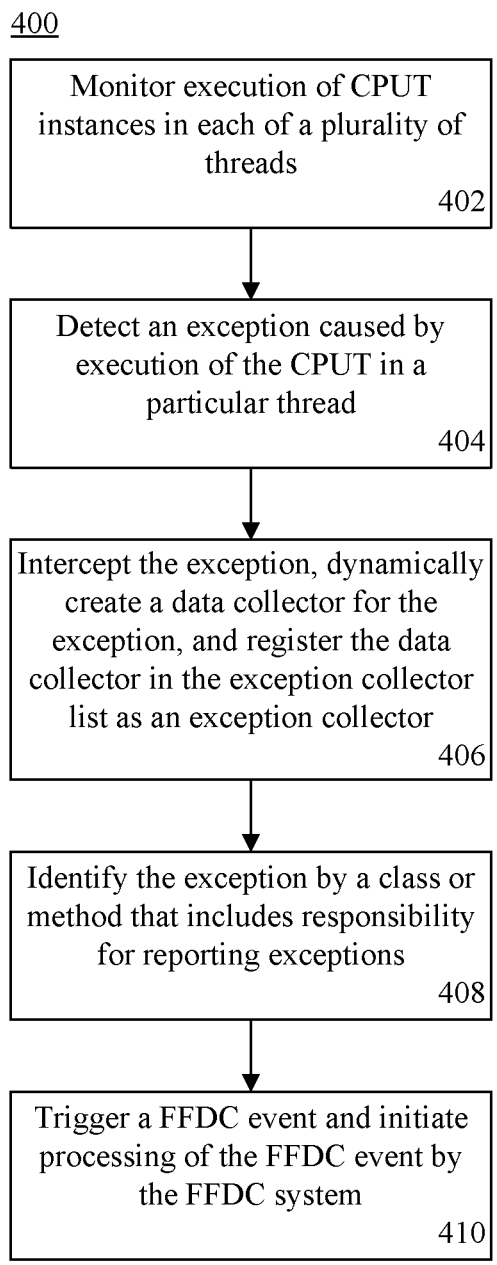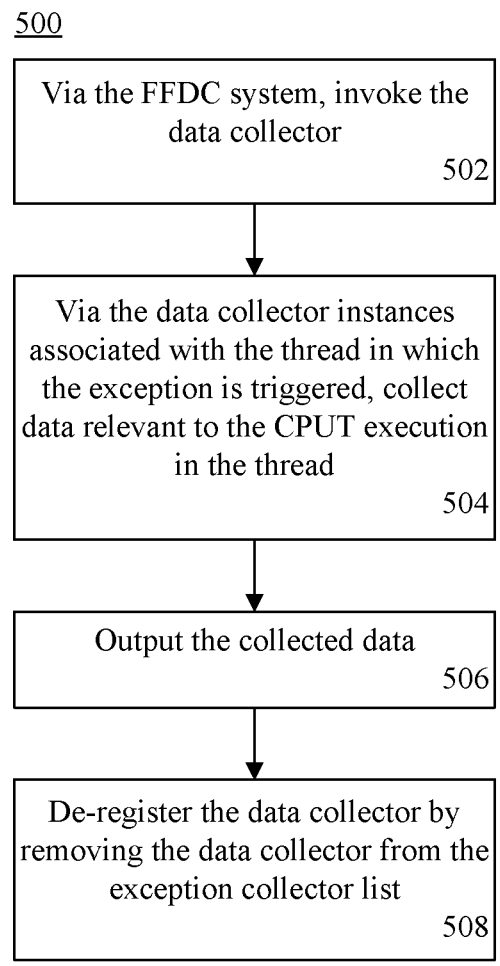
FIG. 4
FIG. 5

THREAD BASED DYNAMIC DATA COLLECTION

BACKGROUND

One or more embodiments disclosed within this specification relate to analysis of software applications.

When an application is executed by a processing system, data related to the application execution oftentimes is recorded into a log file as log file entries. These log file entries can indicate errors that occur during the application execution. Accordingly, the log file can be analyzed in order to determine the source of an error and a potential corrective action that may be implemented in the application to prevent future occurrences of the error.

BRIEF SUMMARY

A method includes monitoring execution of a program in a plurality of threads. The method also can include, responsive to identifying an exception triggered by the program execution in a first of the plurality of threads, dynamically creating a data collector for the exception, the data collector configured to collect data exclusively relevant to the program execution in the first thread.

A system includes a processor configured to initiate executable operations. The executable operations include monitoring execution of a program in a plurality of threads. The executable operations also can include, responsive to identifying an exception triggered by the program execution in a first of the plurality of threads, dynamically creating a data collector for the exception, the data collector configured to collect data exclusively relevant to the program execution in the first thread, registering the data collector with a first failure data capture system as an exception collector in an exception collector list, initiating the data collector to collect the data exclusively relevant to the program execution in the first thread, collecting, using the data collector, the data exclusively relevant to the program execution in the first thread, outputting the data exclusively relevant to the program execution in the first thread and, responsive to outputting the data exclusively relevant to the program execution in the first thread, de-registering the data collector with the first failure data capture system by removing the data collector from the exception collector list.

A computer program product includes a computer-readable storage medium having program code stored thereon, the program code executable by a data processing system to initiate operations. The operations include monitoring execution of a program in a plurality of threads. The operations also can include, responsive to identifying an exception triggered by the program execution in a first of the plurality of threads, dynamically creating a data collector for the exception, the data collector configured to collect data exclusively relevant to the program execution in the first thread, registering the data collector with a first failure data capture system as an exception collector in an exception collector list, initiating the data collector to collect the data exclusively relevant to the program execution in the first thread, collecting, using the data collector, the data exclusively relevant to the program execution in the first thread, outputting the data exclusively relevant to the program execution in the first thread and, responsive to outputting the data exclusively relevant to the program execution in the first thread, de-registering the data collector with the first failure data capture system by removing the data collector from the exception collector list.

BRIEF DESCRIPTION OF THE SEVERAL VIEWS OF THE DRAWINGS

FIG. 4 is a flowchart illustrating a method of exception handling in accordance with one embodiment of the present invention.

FIG. 5 is a flowchart illustrating a method of collecting thread based data in response to an exception being triggered in accordance with one embodiment of the present invention.

DETAILED DESCRIPTION

Figure 1:
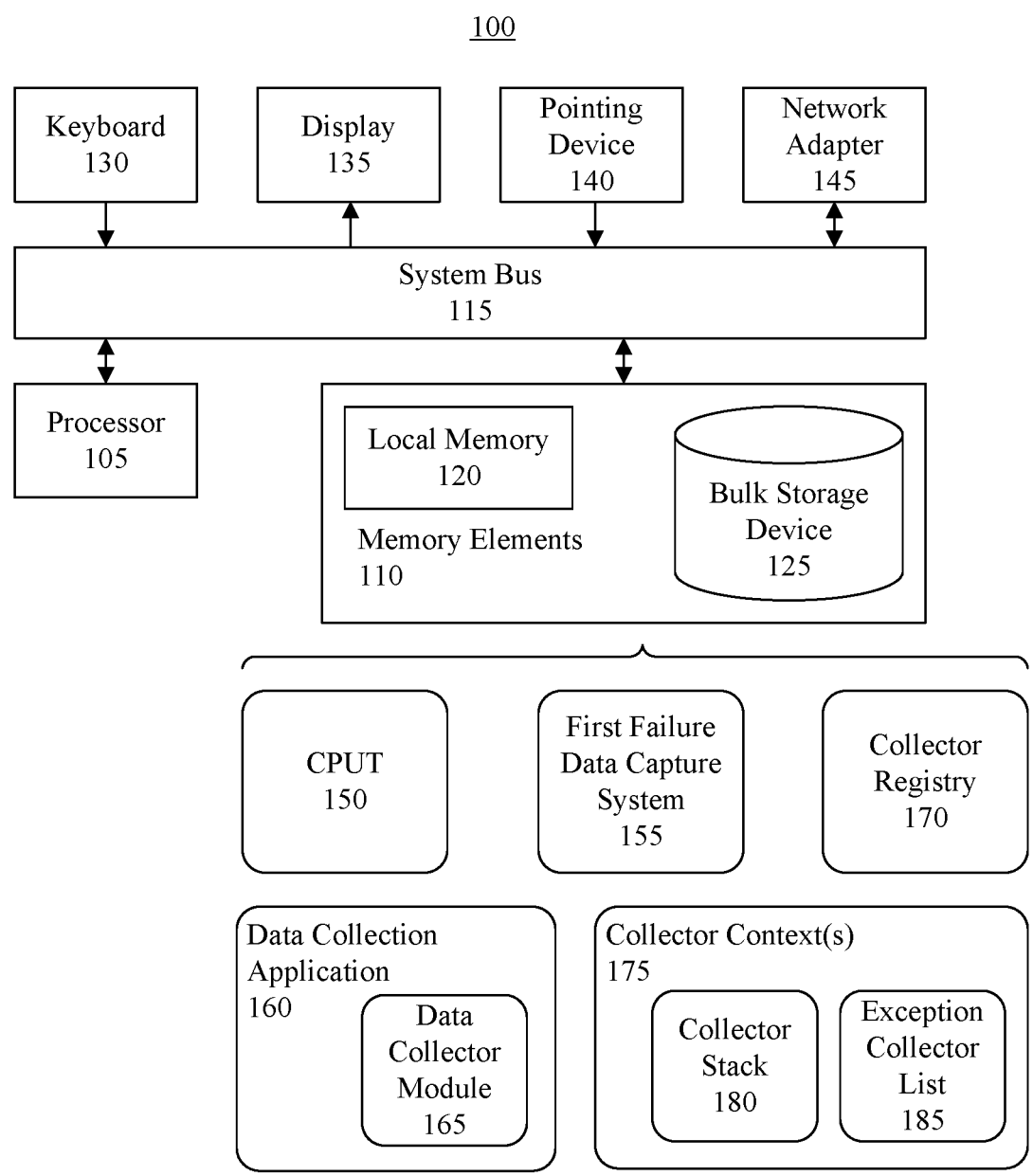
FIG. 1 is a block diagram illustrating a system for dynamically collecting data pertaining to a program execution in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The arrangements described herein relate to dynamically collecting data pertaining to a program execution. More particularly, execution of a program in a plurality of threads is monitored. Responsive to an exception being triggered by the program execution in a first of the plurality of threads, a data collector can be initiated to collect data exclusively relevant to the program execution in the first thread. In this regard, the data collected can be thread specific. Accordingly, program activity related to a thread that encounters an exception can be analyzed, while data unrelated to that thread can be ignored, thus simplifying error analysis.

FIG. 1 is a block diagram illustrating a system 100 for in accordance with one embodiment of the present invention. The system 100 can include at least one processor 105 coupled to memory elements 110 through a system bus 115 or other suitable circuitry. As such, the system 100 can store computer-readable program code (hereinafter "program code") within memory elements 110. The processor 105 can execute the program code accessed from the memory elements 110 via the system bus 115. In one aspect, for example, the system 100 can be implemented as computer that is suitable for storing and/or executing program code. It should be appreciated, however, that the system 100 can be implemented in the form of any system including a processor and memory that is capable of performing the functions and/or operations described within this specification.

The memory elements 110 can include one or more physical memory devices such as, for example, local memory 120 and one or more bulk storage devices 125. Local memory 120 refers to random access memory or other non-persistent memory device(s) generally used during actual execution of the program code. Bulk storage device(s) 125 can be implemented as a hard disk drive (HDD), solid state drive (SSD), or other persistent data storage device. The system 100 also can include one or more cache memories (not shown) that provide temporary storage of at least some program code in order to reduce the number of times program code must be retrieved from bulk storage device 125 during execution.

Input/output (I/O) devices such as a keyboard 130, a display 135, and a pointing device 140 optionally can be coupled to the system 100. The I/O devices can be coupled to the system 100 either directly or through intervening I/O controllers. One or more network adapters 145 also can be coupled to the system 100 to enable the system 100 to become coupled to other systems, computer systems, remote printers, and/or remote storage devices through intervening private or public networks. Modems, cable modems, and Ethernet cards are examples of different types of network adapters 145 that can be used with the system 100.

As pictured in FIG. 1, the memory elements 110 can store a computer program under test (CPUT) 150, a first failure data capture (FFDC) system 155, and a thread-specific data collection application (hereinafter "data collection application") 160, each of which can be implemented in the form of executable program code and can be executed by the system 100. The data collection application 160 can include a data collector module 165 that creates thread based data collectors (hereinafter "data collectors"), which are configured to collect thread specific data corresponding to execution of the CPUT 150 in various respective threads. Specifically, when each instance of the CPUT 150 is executed, instances of the data collectors can be initialized. Each data collector instance can correspond to a particular class or method associated with the CPUT 150.

The memory elements 110 also can store a collector registry 170 and one or more thread based collector contexts (hereinafter "collector contexts") 175. Each collector context 175 can include a collector stack 180 and an exception collector list 185. The collector stack 180 can store a reference to each instance of the data collectors that are initialized for a corresponding instance of the CPUT 150 to collect data pertaining to the execution of that instance of the CPUT 150, and store a reference to a particular class or method tracked by the data collector. The exception collector list 185 can hold references to each instance of a data collector that is initialized to collect data related to an exception caused by execution of the instance of the CPUT 150. In this regard, the data collectors referenced in the exception collector list 185 can be referred to as "exception collectors."

The CPUT 150, the FFDC system 155, the thread specific data collection application 160, the collector registry 170 and the collector context 175 can be considered part of the system 100. In one embodiment, the thread specific data collection application 155, the FFDC system 160, the collector registry 170 and the collector context(s) 175 can be implemented in IBM® WebSphere® Enterprise Service Bus, though the invention is not limited in this regard (IBM and WebSphere are trademarks of International Business Machines Corporation in the United States, other countries, or both).

In operation, a plurality of instances of the CPUT 150 can be executed by the processor 105 in different threads. The CPUT 150 can be, for example, a web-based application, though the invention is not limited in this regard; the CPUT 150 can be any other application for which multiple instances of the application may be executed in different threads. When an exception in one of the threads occurs, the corresponding instances of the data collectors can capture data corresponding to the exception, as well as context information relating to the thread execution, and store data and context information in the memory elements 110. The data and context information can be accessed to analyze the circumstances related to cause of the exception, and whether further FFDC events should be triggered. The following flowcharts provide further details on such operations.

Figure 2:
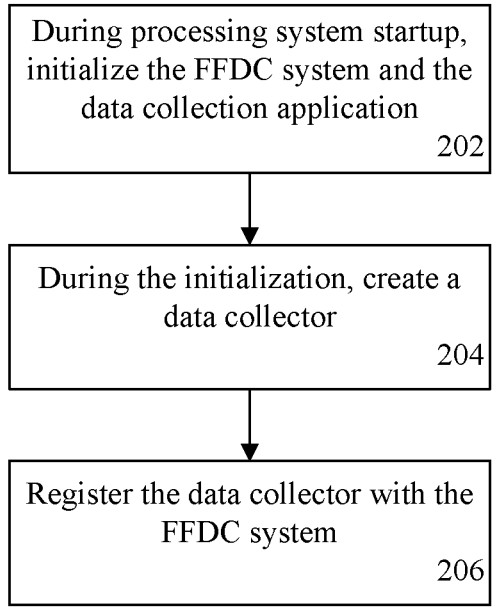
FIG. 2 is a flowchart illustrating a method of registering a component data collector with a first failure data capture (FFDC) system in accordance with one embodiment of the present invention.

FIG. 2 is a flowchart illustrating a method 200 of registering a component data collector with a FFDC system in accordance with one embodiment of the present invention. At step 202, during startup of a processing system, such as the processing system 100 of FIG. 1, the FFDC system and the data collection application can be initialized, for example by invocation of respective initialize( ) methods. At step 204, during initialization of the data collection application, the data collector can be initialized. At step 206, the data collector can be registered with the FFDC system.

Figure 3:
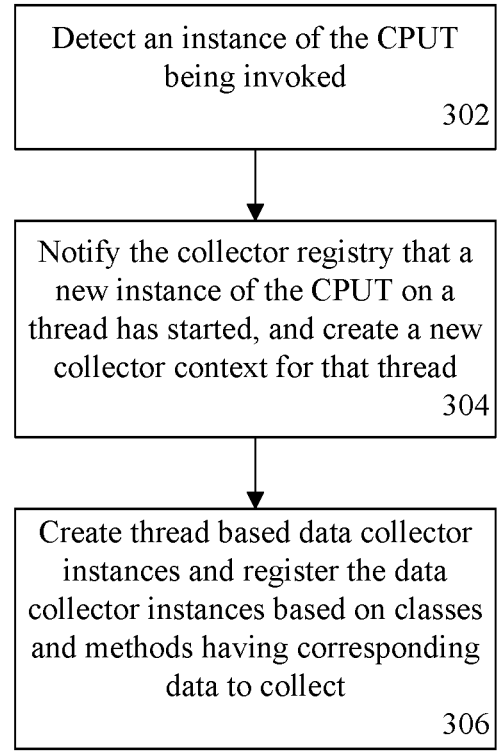
FIG. 3 is a flowchart illustrating a method of creating a thread based collector context in accordance with one embodiment of the present invention.

FIG. 3 is a flowchart illustrating a method 300 of creating a thread based collector context in accordance with one embodiment of the present invention. At step 302, an instance of a CPUT being invoked can be detected. For example, a processMessage( ) method being invoked can be detected. At step 304, a CPUT entry method can notify the collector registry that a new instance of the CPUT on a thread has started, and the collector registry can create a thread based collector context for that thread. It is noted that multiple instances of the CPUT may be executing in different threads, and a collector context can be created for each instance of the CPUT.

At step 306, thread based data collector instances can be created by the collector registry to collect data corresponding to execution of the new instance of the CPUT in a corresponding thread. Further, the data collector instances can be registered based on classes and methods having corresponding data to collect. For example, a reference to each data collector instance can be added to the collector stack associated with the collector context created for the thread in which the particular instance of the CPUT is executing, and the class or method to which each data collector instance corresponds can be identified in the collector stack.

FIG. 4 is a flowchart illustrating a method 400 of exception handling in accordance with one embodiment of the present invention. At step 402, the execution of CPUT instances can be monitored in each of a plurality of threads. At step 404, an exception caused by execution of an instance of the CPUT in a thread can be detected. For example, a catch( ) method can be implemented. At step 406, the data collection application can intercept the exception and, via the data collector module and/or the collector registry, dynamically create a data collector for the exception. In illustration, the data collector for the exception can be an exception collector that the collector registry registers in the exception collector list. At step 408, the exception can be identified by a class or method that includes responsibility for reporting executions.

At step 410, an FFDC event can be triggered by the FFDC and processing of the FFDC event can be initiated by the FFDC system. For example, the exception caught at step 404 can be re-thrown such that hither methods/functions may themselves catch the exception and perform their own processing. Although other class/methods higher in the stack may also have responsibility for reporting the exceptions, because the FFDC already has been recorded for the particular exception, no further FFDC events need be triggered. In other words, a single instance of the FFDC need only be initiated for a particular exception that is identified. A second FFDC instance need not be initiated if it contains data contained in the first FFDC instance. This feature can be achieved using a state held in the collector context.

FIG. 5 is a flowchart illustrating a method 500 of collecting thread based data in response to an exception being triggered in accordance with one embodiment of the present invention. At step 502, via the FFDC system, the data collector created during the initialization of the processing system (FIG. 2, step 204) can be invoked. At step 504, via the data collector instances associated with the thread in which the exception is triggered, data relevant to the CPUT execution in the thread, such as context data, can be collected. For example, the data collection application can iterate through the data collectors, invoking each of the data collectors to perform data collection. The data relevant to the CPUT execution can include data exclusively relevant to execution of the CPUT instance. For example, at least one data collector can be invoked that collects data exclusively relevant to the CPUT execution in the thread. Since data irrelevant to the CPUT execution in the particular thread is not collected, a failure analysis process can be streamlined.

Initiation of the data collector by the FFDC system can occur prior to FFDC functions of the FFDC system being initiated. In other words, the FFDC system can initiate the data collectors prior to initiation of other FFDC specific functions. The data collector can be initiated to collect data for an instance of a method in a call stack nearest an exception in the call stack. The exception can be an original exception triggered by the program execution in the thread. The invention is not limited in this regard, however, and data for other instances of the method in the call stack can be collected in addition to, or in lieu of, data for the method nearest the original exception in the call stack. In another arrangement, the data collector can be initiated to collect data for an instance of a method in a call stack nearest an original execution of the program in the call stack.

Further, the data collector can be initiated once for a corresponding initiation of the FFDC system, and initiation of the corresponding FFDC system can be limited to a single instance of the FFDC system for the identified exception, though this need not be the case. In illustration, the occurrence of the FFDC on the thread for a particular exception can be noted for the thread based on the collector context, and this information can be used to determine that further FFDC events need not be initiated, or to determine that further FFDC events may be initiated.

At step 506, the collected data can be output for analysis. For example, the data can be output to a file and the file can be associated with the thread in which the exception is triggered. The data can be applied, for example, to a trace of a program execution. In another example, the data can be applied to an error analysis application, for instance to determine where to put an execution break in the CPUT to capture other data relevant to the CPUT execution.

At step 508, the data collector can be de-registered can de-register by removing the data collector from the exception collector list. De-registering of the data collector can occur while the CPUT continues to execute. In this regard, the method 400 of FIG. 4 can continue while the method 500 is implemented.

Like numbers have been used to refer to the same items throughout this specification. The flowcharts and block diagram in the Figures illustrate the architecture, functionality, and operation of possible implementations of systems, methods and computer program products according to various embodiments of the present invention. In this regard, each block in the flowcharts or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowcharts illustrations, and combinations of blocks in the block diagram and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method comprising:
   monitoring execution of a program in a plurality of threads;
   responsive to identifying an exception triggered by the program execution in a first of the plurality of threads, dynamically creating a data collector for the exception, the data collector configured to collect data exclusively relevant to the program execution in the first thread;
   prior to a function of a first failure data capture system being initiated, initiating the data collector to collect the data exclusively relevant to the program execution in the first thread;
   collecting, using the data collector, the data exclusively relevant to the program execution in the first thread; and
   outputting the data exclusively relevant to the program execution in the first thread.

2. The method of claim 1, wherein the initiating the data collector to collect the data exclusively relevant to the program execution in the first thread comprises initiating the data collector once for a corresponding initiation of the first failure data capture system.

3. The method of claim 2, wherein the initiating the data collector to collect the data exclusively relevant to the program execution in the first thread comprises limiting the initiation of the corresponding first failure data capture system to a single instance of the first failure data capture system for the identified exception.

4. The method of claim 1, wherein the initiating the data collector to collect the data exclusively relevant to the program execution in the first thread comprises initiating the data collector to collect the data for an instance of a method in a call stack nearest the exception in the call stack, wherein the exception is an original exception triggered by the program execution in the first of the plurality of threads.

5. The method of claim 1, further comprising:
   registering the data collector with a first failure data capture system as an exception collector in an exception collector list; and
   responsive to outputting the data exclusively relevant to the program execution in the first thread, de-registering the data collector with the first failure data capture system by removing the data collector from the exception collector list.

6. A system comprising:
   a processor configured to initiate executable operations comprising:
   monitoring execution of a program in a plurality of threads;
   responsive to identifying an exception triggered by the program execution in a first of the plurality of threads, dynamically creating a data collector for the exception, the data collector configured to collect data exclusively relevant to the program execution in the first thread;
   prior to a function of a first failure data capture system being initiated, initiating the data collector to collect the data exclusively relevant to the program execution in the first thread;
   collecting, using the data collector, the data exclusively relevant to the program execution in the first thread; and
   outputting the data exclusively relevant to the program execution in the first thread.

7. The system of claim 6, wherein the initiating the data collector to collect the data exclusively relevant to the program execution in the first thread comprises the processor initiating the data collector once for a corresponding initiation of the first failure data capture system.

8. The system of claim 7, wherein the initiating the data collector to collect the data exclusively relevant to the program execution in the first thread comprises the processor limiting the initiation of the corresponding first failure data capture system to a single instance of the first failure data capture system for the identified exception.

9. The system of claim 6, wherein the initiating the data collector to collect the data exclusively relevant to the program execution in the first thread comprises the processor initiating the data collector to collect the data for an instance of a method in a call stack nearest the exception in the call stack, wherein the exception is an original exception triggered by the program execution in the first of the plurality of threads.

10. The system of claim 6, wherein the processor is further configured to initiate executable operations comprising:
registering the data collector with a first failure data capture system as an exception collector in an exception collector list; and
responsive to outputting the data exclusively relevant to the program execution in the first thread, de-registering the data collector with the first failure data capture system by removing the data collector from the exception collector list.

11. A computer program product, comprising:
a computer-readable storage medium having program code stored thereon, wherein the computer-readable storage medium is not a transitory, propagating signal per se, the program code executable by a data processing system to initiate operations including:
monitoring execution of the program in a plurality of threads; and
responsive to identifying an exception triggered by the program execution in a first of the plurality of threads, dynamically creating a data collector for the exception, the data collector configured to collect data exclusively relevant to the program execution in the first thread;
prior to a function of a first failure data capture system being initiated, initiating the data collector to collect the data exclusively relevant to the program execution in the first thread;
collecting, using the data collector, the data exclusively relevant to the program execution in the first thread; and
outputting the data exclusively relevant to the program execution in the first thread.

12. The computer program product of claim 11, wherein the initiating the data collector to collect the data exclusively relevant to the program execution in the first thread comprises initiating the data collector once for a corresponding initiation of the first failure data capture system.

13. The computer program product of claim 12, wherein the initiating the data collector to collect the data exclusively relevant to the program execution in the first thread comprises limiting the initiation of the corresponding first failure data capture system to a single instance of the first failure data capture system for the identified exception.

14. The computer program product of claim 11, wherein the initiating the data collector to collect the data exclusively relevant to the program execution in the first thread comprises initiating the data collector to collect the data for an instance of a method in a call stack nearest the exception in the call stack, wherein the exception is an original exception triggered by the program execution in the first of the plurality of threads.

15. The computer program product of claim 11, wherein the program code is executable by the data processing system to initiate operations further comprising:
registering the data collector with a first failure data capture system as an exception collector in an exception collector list; and
responsive to outputting the data exclusively relevant to the program execution in the first thread, de-registering the data collector with the first failure data capture system by removing the data collector from the exception collector list.

* * * * *